March 27, 1934.  C. C. FARMER  1,953,007
CHECK VALVE DEVICE
Filed July 24, 1930
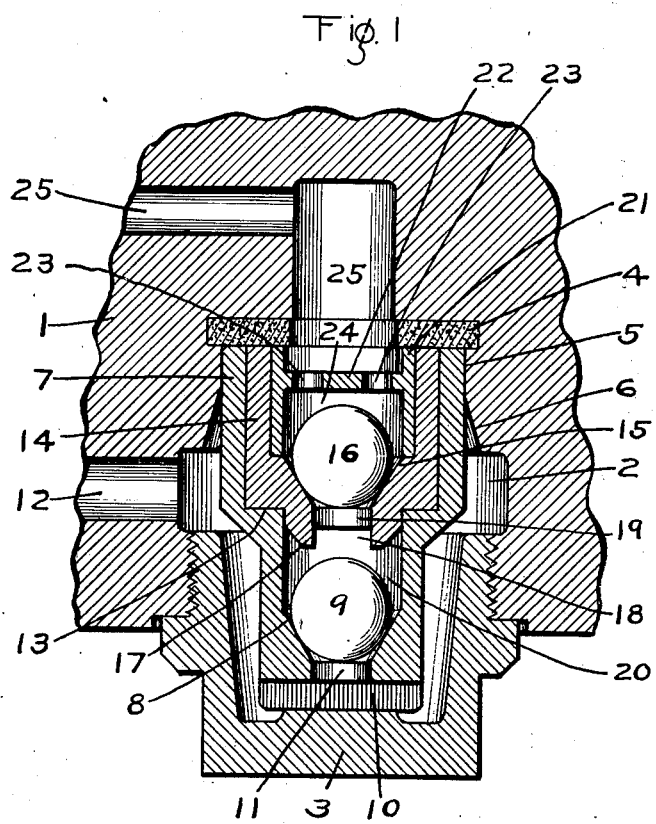
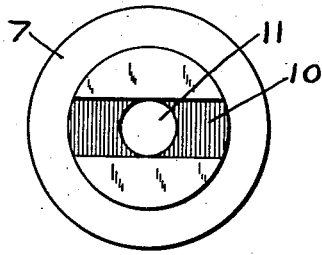
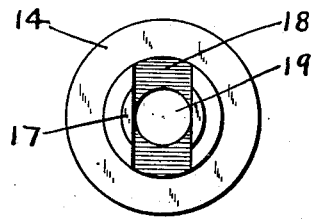
INVENTOR.
CLYDE C. FARMER
BY *Wm. M. Cady*
ATTORNEY.

Patented Mar. 27, 1934

1,953,007

UNITED STATES PATENT OFFICE 1,953,007

CHECK VALVE DEVICE

Clyde C. Farmer, Pittsburgh, Pa., assignor to The Westinghouse Air Brake Company, Wilmerding, Pa., a corporation of Pennsylvania Application July 24, 1930, Serial No. 470,292

3 Claims. (Cl. 277—70)

This invention relates to means for mounting a plurality of check valves in series.

In some cases it is desirable, as a safety measure, to arrange a plurality of check valves especially ball check valves in series to insure the closing off of back flow of fluid through a passage in the event of one of the valves failing to seat properly.

Heretofore it has been the practice, in mounting ball check valves in series, to provide a separate recess in the casing of a device of a fluid pressure equipment for the reception of each check valve and to connect said recesses through a cored passage. This arrangement requires considerable casing space for the formation of the ball check valve receiving recesses and the connecting passage from one recess to the other and is therefore objectionable, especially in cases where the casing space is limited. Another objectionable feature of this arrangement is that it requires complicated and expensive coring and is further objectionable in that it requires the separate removal and replacement of each check valve in case of repair, cleaning or inspection.

The principal object of my invention is to provide novel and compact means for mounting a plurality of check valves, especially ball check valves, in series in a casing and which will be free from the above mentioned objectionable features.

Another object of my invention is to provide a check valve assembly comprising a plurality of valve seat members which are so mounted with respect to each other that they, together with their respective check valves, may be applied to and removed from a casing as a unit.

Other objects and advantages will appear in the following more detailed description of the invention.

In the accompanying drawing; Figure 1 is a sectional view through a portion of a casing having two ball check valves mounted therein in accordance with my invention; Fig. 2 is a bottom plan view of one of the valve seat members; and Fig. 3 is a bottom plan view of another of the valve seat members.

In the drawing, the reference character 1 indicates a portion of the casing of any part or device of a fluid pressure equipment, said casing having a recess 2 formed therein which is open at one end. The open end of the recess is adapted to be closed by a cap nut 3 having screw-threaded connection with the casing.

Mounted in the casing and abutting the inner end wall of the recess 2 is a gasket 4. For a short distance below the gasket 4 and as indicated by the reference character 5, the interior circular wall of the inner end of the recess is vertically disposed and at 6 is flared to provide a large tapering mouth for that portion of the recess defined by the vertically disposed portion of the wall.

Contained in the recess 2, and clamped in leak proof engagement with the gasket 4 by the cap nut 3, is a hollow valve seat member 7 having an interior valve seat 8 for a ball check valve 9 contained in the member. Exteriorly, this valve seat member has formed in its lower end a groove 10 which is constantly open to a passage 11 leading to the under side of the ball check valve 9 and which is also constantly open to fluid pressure supply passage 12 by way of that portion of the recess 2 which is defined by the outer surface of the member and the inner surface of the cap nut 3 and the casing.

Intermediate its ends and interiorly, the valve seat member 7 is provided with an annular shoulder 13 upon which is seated a valve member 14 which is contained in the member 7. By reason of the engagement of the valve seat member 14 by the shoulder 13 of the member 7, the upper end of the seat member 14 will be clamped in leak proof engagement with the gasket 4. Interiorly, the valve seat member 14 is provided with a valve seat 15 for a ball check valve 16 contained in the member.

The lower end portion 17 of the valve seat member 14, when said member is in its proper position as shown in the drawing, extends a short distance below the shoulder 13 of the member 7 and terminates a short distance above the ball check valve 9 and forms a stop for limiting upward movement of the check valve 9. Exteriorly there is formed in this portion of the member 14, a groove 18 which is constantly open to a passage 19 leading to the underside of the ball check valve 16 and which is constantly open to the chamber 20 containing the ball check valve 9.

Contained in the hollow valve seat member 14, and clamped against the gasket 4 by the member 14, is a stop member 21 having a web 22 which is adapted to limit upward movement of the ball check valve 16, said web having openings 23 for constantly establishing communication from the chamber 24 containing the ball check valve 16 and a fluid pressure outlet passage 25.

It will be noted that the cap nut 3, when in clamping engagement with the lower end of the valve seat member 7, will engage the member on each side of the groove 10 and will not prevent the flow of fluid through the groove. It will also be noted that the ends of the groove 18 in the valve seat member 14 are open so that when the ball check valve 9 is in its raised position it cannot close off the flow of fluid through the groove from the check valve chamber 20. Further, the openings 23 in the web 22 of the stop member are so arranged that the ball check valve 16, when it is in its raised position, cannot close off the flow of fluid through these openings.

The upper end of the valve seat member 7 preferably has a slip fit with the casing so as to facilitate the application of the check valve mounting to the casing and also its removal from the casing. Further, the several parts of the mounting have slip fits with each other so as to facilitate their assembly and disassembly.

To assemble the several parts of the check valve mounting, the ball check valve 9 is first placed in the valve seat member 7, the valve seat member 14 is then inserted in the member 7 and next the ball check valve 16 is placed in the valve seat member 14 and finally the stop member 21 is inserted in the valve seat member 14.

To apply the assembled check valve mounting to the casing, the mounting as a unit is inserted in the recess 2 through the open end thereof and when the upper end thereof is in engagement with the gasket 4, the cap nut 3 is screwed in the casing, thus clamping the mounting in position. It will here be noted that as the mounting is being inserted in the recess 2, the upper end of the valve seat member 7 will engage the flared portion 6 of the wall of the recess and due to such engagement will be guided into that portion of the recess defined by the vertically disposed portion 5 of the wall, thus rendering it easy to apply the mounting to the casing.

All that is required to permit the removal of the mounting as a unit is the removal of the cap nut 3 from the casing.

While one illustrative embodiment of the invention has been described in detail, it is not my invention to limit its scope to that embodiment or otherwise than by the terms of the appended claims.

Having now described my invention, what I claim as new and desire to secure by Letters Patent, is:

1. The combination with a casing having a single check valve receiving recess connected to a fluid pressure supply passage, of means contained in said recess and removably carried by said casing forming, in effect, a portion of said passage, of check valve means including a plurality of check valves arranged in series adapted to be inserted in said recess as a unit, said means being adapted to prevent back flow of fluid through said passage, a tapered wall in said casing for guiding said check valve means to its proper position as the check valve means is being inserted in said casing, said check valve means having a slip fit with the casing when the check valve means is moved past the inner edge of the sloping wall, and means having screw-threaded connection with the casing for clamping said check valve means in its proper position in the casing.

2. The combination with a casing having a check valve receiving recess forming a portion of a fluid conducting passage, a check valve seat member inserted in said recess, a check valve adapted to seat on said member to prevent back flow of fluid through said passage, a sloping wall in said casing for guiding said seat member to its proper position as the member is inserted in the recess, said seat member having a slip fit with the casing when the member is moved beyond the inner edge of the sloping wall, and a member having screw-threaded connection with the casing and engaging the seat member for holding the seat member positioned.

3. The combination with a casing having a check valve receiving recess forming a portion of a fluid conducting passage, a check valve seat member inserted in said recess, a check valve adapted to seat on said member to prevent back flow of fluid through said passage, a sloping circular wall in said casing for guiding said seat member to its proper position as the member is inserted in the recess, said seat member having a slip fit with the casing when the member is moved beyond the inner edge of the sloping wall, and a member having screw-threaded connection with the casing and engaging the seat member for holding the seat member positioned.

CLYDE C. FARMER.